United States Patent [19]
Sui et al.

[11] Patent Number: 5,863,661
[45] Date of Patent: Jan. 26, 1999

[54] METHOD OF ENHANCING THE C-AXIS PERPENDICULAR ORIENTATION OF BARIUM HEXAFERRITE THIN FILMS AND BARIUM HEXAFERRITE THIN FILM RECORDING MEDIA PRODUCED THEREBY

[75] Inventors: Xiaoyu Sui; James A. Bain, both of Pittsburgh; Mark H. Kryder, Bradfordwoods, all of Pa.

[73] Assignee: Carnegie Mellon University, Pittsburgh, Pa.

[21] Appl. No.: 634,051

[22] Filed: Apr. 17, 1996

Related U.S. Application Data

[63] Continuation of Ser. No. 319,964, Oct. 7, 1994, abandoned.

[51] Int. Cl.$^6$ ........................................... G11B 5/66
[52] U.S. Cl. ................ 428/469; 428/472.2; 428/694 TS; 428/900; 427/131; 204/192.15; 204/192.2
[58] Field of Search ................................. 428/469, 472.2, 428/694 TS, 670, 900; 427/131; 204/192.2, 192.15

[56] References Cited

U.S. PATENT DOCUMENTS

| | | | |
|---|---|---|---|
| 4,587,176 | 5/1986 | Carcia | 428/611 |
| 5,567,523 | 10/1996 | Rosenblum et al. | 428/408 |

FOREIGN PATENT DOCUMENTS

| | | |
|---|---|---|
| 61-199233 | 9/1986 | Japan . |
| 01320619 | 12/1989 | Japan . |

OTHER PUBLICATIONS

"Microstructural Origin of the Perpendicular Anisotropy in M–type Barium Hexaferrite Thin Films Deposited by rf Magnetron Sputtering," by Xiaoyu Sui et al., *IEEE Transactions On Magnetics*, vol. 29, No. 6, Nov. 1993.

"Magnetic Easy Axis Randomly In–Plane Oriented Barium Hexaferrite Thin Film Media," by Xiaoyu Sui et al., *Appl. Phys. Lettr.* 63 (11), Sep. 13, 1993.

"Ba–Ferrite Thin Film Rigid Disk for High Density Perpendicular Magnetic Recording," by A. Morisako et al., *IEEE Transactions On Magnetics*, vol. MAG–22, No. 5, Sep. 1986.

"C–Axis Orientation Of Hexagonal Ferrite Films Prepared By Rf Mode Sputtering,"by A. Morisako et al., *Journal of Magnetism and Magnetic Materials*, 54–57, pp. 1657–1658 Mar. (1986).

M. Matsuoka, Y. Hoshi, M. Naoe and S. Yamanaka, "Formation of Ba–Ferrite Films With Perpendicular Magnetization by Targets–Facing Type of Sputtering" Nov. 1982, 1119–1121, *IEEE. Trans. Mag.*, Mag–18, No. 6.

M. Matsuoka, Y. Hoshi, M. Naoe and S. Yamanaka, "Preparation of Ba–Ferrite Films For Perpendicular Magnet Recording 2Y RF Targets Facing Type of Sputtering" Sep. 1984, 800–822, *IEEE Trans. Mag.*, MAG–20, No. 5.

A. Morisako, M. Matsumoto ad M. Naoe, "Influences of Sputtering Gas Pressure on Microtexture and Crystallographic Characteristics of Ba–Ferrite Thin Films For High Density Recording Media" Jan. 1987, 56–68, *IEEE Trans. Mag.*, MAG–23, No. 1.

(List continued on next page.)

*Primary Examiner*—Stevan A. Resan
*Attorney, Agent, or Firm*—Reed Smith Shaw & McClay LLP

[57] ABSTRACT

A method of making c-axis perpendicularly oriented barium hexaferrite thin films by the crystallization of amorphous barium hexaferrite on a platinum underlayer is provided. Using a thin underlayer of platinum, barium hexaferrite films can be deposited by conventional rf diode or magnetron sputtering. Such deposition may be performed at room temperature, after which excellent c-axis perpendicular orientation can be achieved by rapid ex-situ annealing. The c-axis perpendicular orientation can also be achieved through in-situ annealing.

17 Claims, 5 Drawing Sheets

OTHER PUBLICATIONS

M. Matsuoka and M. Naoe, "Ba–Ferrite Thin–film Disk for Perpendicular Magnetic Recording" Apr. 1985, 4040–4042, *J. Appl. Phys.* 57 (1).

M. Matsuoka and M. Naoe, "Sputter Deposition and Read/Write Characteristics of Ba–Ferrite Thin Film Disk" Sep. 1985, 1474–1476, *IEEE Trans. Mag.*, MAG–21, No. 5.

E. Lacroix, P. Gerard, G. Marest and M. Dupuy, "Substrate effects on the crystalline oreintation of barium hexaferrite films" Apr. 1991, 4770–4772, *J. Appl. Phys.*, 69(8).

M. S. Yuan, H. L. Glass and L. R. Adkins, "Epitaxial Barium Hexaferrite on Sapphire by Sputter Deposition"Jul. 1988, 340–341, *Appl. Phys. Lett.* 53(4).

T. L. Hylton, M.A. Parker and J.K. Howard, Preparation and magnetic properties of epitaxial barium ferrite thin films on sapphire with in–plane, uniaxial anisotropy, Aug. 1992, 867–869, *Appl. Phys. Lett.*, 61, No. 7.

T. L. Hylton, M.A. Parker, K. R. Coffey and J. K. Howard, Properties of epitaxial Ba–hexaferrite thin films on A–, R–and C–plane oriented May 1993, 6257–6259, *J. Appl. Phys.*, 73.

M. Matsuoka, Y. Hoshi, M. Naoe and S. Yamanaka, "Formation of Ba–Ferrite Films With PerpendicularMagnetization by Targets–Facing Type of Sputtering" 1982, 1119–1121, *IEEE. Trans. Mag.*, Mag–18.

M. Matsuoka, Y. Hoshi, M. Naoe and S. Yamanka, "Preparation of Ba–Farrite Films For PerpendicularMagnet Recording 2Y RF Targets Facing Type of Sputtering" 1984, 800–802, *IEEE Trans. Mag.*, MAG–20.

A. Morisako, M. Matsumoto and M. Naoe, "Influences of Sputtering Gas Pressure on Microtexture and Crystallographic Characteristics of Ba–Ferrite Thin Films For High Density Recording Media" 1987, 56–58, *IEEE Trans. Mag.*, MAG–23.

METHOD OF ENHANCING THE C-AXIS PERPENDICULAR ORIENTATION OF BARIUM HEXAFERRITE THIN FILMS AND BARIUM HEXAFERRITE THIN FILM RECORDING MEDIA PRODUCED THEREBY

This application is a continuation of application Ser. No. 08/319,964, filed on Oct. 7, 1994, now abandoned the contents of which are hereby incorporated by reference.

FIELD OF THE INVENTION

The present invention relates to a method of enhancing the c-axis perpendicular orientation of barium hexaferrite thin films and barium hexaferrite thin film recording media produced thereby, and especially to the enhancement of the c-axis perpendicular orientation of barium hexaferrite thin films through the use of a platinum underlayer.

BACKGROUND OF THE INVENTION

Because of thermal stability limitations, longitudinal recording is not expected to be suitable to achieve a 100 Gbit/in$^2$/recording density. Reduced demagnetizing fields in the recorded transition make perpendicular magnetic recording more favorable at such a high recording density.

Thus, extensive research on the subject of perpendicular magnetic recording has been ongoing for more than a decade. Although perpendicular recording was predicted in the late 1970s to be able to achieve higher recording density than longitudinal recording, current technology still favors magnetic easy axis in-plane oriented media.

To achieve the perpendicular mode at high recording densities, the recording medium is required to have not only a large perpendicular anisotropy, but also good chemical stability and high mechanical hardness. Barium hexaferrite is a very promising candidate to provide these characteristics.

Indeed, many research efforts have been made to deposit high quality barium hexaferrite films. See e.g., M. Matsuoka, Y. Hoshi, M. Naoe and S. Yamanaka, *IEEE. Trans. Mag.*, Mag-18, 1119–1121 (1982); M. Matsuoka, Y. Hoshi, M. Naoe and S. Yamanaka, *IEEE Trans. Mag.*, MAG-20, 800–802 (1984); A. Morisako, M. Matsumoto and M. Naoe, *IEEE Trans. Mag.*, MAG-23, 56–58 (1987); M. Matsuoka and M. Naoe, *J. Appl. Phys.* 57 (1), 4040–4042 (1985); and M. Matsuoka and M. Naoe, *IEEE Trans. Mag.*, MAG-21, 1474–1476 (1985). These studies have used target facing type sputtering (TFTS) and conventional rf or dc diode sputtering with in-situ annealing.

A current popular technique for producing barium hexaferrite films for perpendicular recording and magneto-optical recording is TFTS. Although this method produces good c-axis perpendicular orientation, there are several significant drawbacks. First, the sputtering machines required are not commonly used in industry, impeding commercialization of the process. Moreover, the TFTS method uses a very high in-situ temperature during deposition to crystallize the material (typically around 600° C.), which is an additional impediment to commercialization. Still further, the complicated interfacial structure between barium hexaferrite and silicon dioxide, caused by interdiffusion of barium into silicon dioxide, makes it difficult to fabricate very thin barium hexaferrite films. E. Lacroix, P. Gerard, G. Marest and M. Dupuy, *J. Appl. Phys.*, 69, 4770–4772 (1991).

For microwave/millimeter wave applications, a number of researchers have attempted to grow barium hexaferrite epitaxially on single crystal sapphire substrates. The epitaxial film is then used as a seed layer for the growth of a much thicker film using the liquid phase epitaxy (LPE) technique. M. S. Yuan, H. L. Glass and L. R. Adkins, *Appl. Phys. Lett.*, 53(4), 340–341 (1988). However, it has been reported that the seed layer gives a non-uniaxial-like torque curve in the perpendicular torque magnetometer measurement, indicating imperfect c-axis perpendicular orientation. T. L. Hylton, M. A. Parker, K. R. Coffey and J. K. Howard, paper EC-06, submitted to Magnetism and Magnetic Materials Conference, Houston, Tex. (Dec., 1992). It has also been reported that aluminum starts to diffuse from sapphire into barium hexaferrite above 1000° C., which makes LPE growth of pure barium hexaferrite by this method questionable. T. L. Hylton, M. A. Parker and J. K. Howard, *Appl. Phys. Lett.*, 61, No. 7,867–869 (1992). Typical LPE processes normally involve very high temperatures (above 1000° C.).

Thus, although barium hexaferrite thin films are attractive materials for potential applications in magnetic recording, magneto-optical recording and microwave/millimeter wave devices, several materials processing problems must be resolved to develop a method for controlling the crystal orientation of barium hexaferrite thin films in a manner amenable to commercial production.

SUMMARY OF THE INVENTION

Accordingly, the present invention provides a method of enhancing the c-axis perpendicular orientation of barium hexaferrite thin films that does not suffer from the drawbacks of prior methods.

Generally, the present invention provides a new approach for making c-axis perpendicularly oriented barium hexaferrite thin films by the crystallization of amorphous barium hexaferrite on a platinum underlayer. With the help of this thin underlayer, barium hexaferrite films can be deposited by a number of methods, including, but not limited to conventional rf diode and magnetron sputtering. Preferably, such deposition is performed at relatively low temperature (for example, at room temperature), after which excellent c-axis perpendicular orientation can be achieved by rapid ex-situ annealing. However, c-axis perpendicular orientation can also be achieved through in-situ annealing (i.e., high-temperature deposition).

The present invention thus provides a method of producing a barium hexaferrite thin film exhibiting c-axis perpendicular orientation, comprising the steps of:

a. depositing an underlayer of platinum upon a substrate; and b. depositing upon the platinum underlayer a thin film of barium hexaferrite to produce a two-layer film.

The present invention also provides a barium hexaferrite thin film recording medium, comprising:

a. a substrate;

b. a platinum underlayer deposited upon the substrate; and c. a barium hexaferrite thin film deposited upon the platinum underlayer.

The good interface between barium hexaferrite and the present underlayer, allows production of very thin (one unit cell, i.e., 23 Å) barium hexaferrite films with perpendicular anisotropy. With the addition of the platinum underlayer, excellent c-axis perpendicular orientation can be achieved. Additionally, platinum may act as a diffusion barrier, blocking the intermixing of barium atoms with the substrate.

Moreover, the present invention allows production of thin barium hexaferrite films with perpendicular anisotropy without the use of time consuming and costly vacuum annealing. The present films can be produced quickly and a wide variety of substrates are available because of the Pt diffusion barrier.

DETAILED DESCRIPTION OF THE PREFERRED EMBODIMENT OF THE INVENTION

Figure 1:
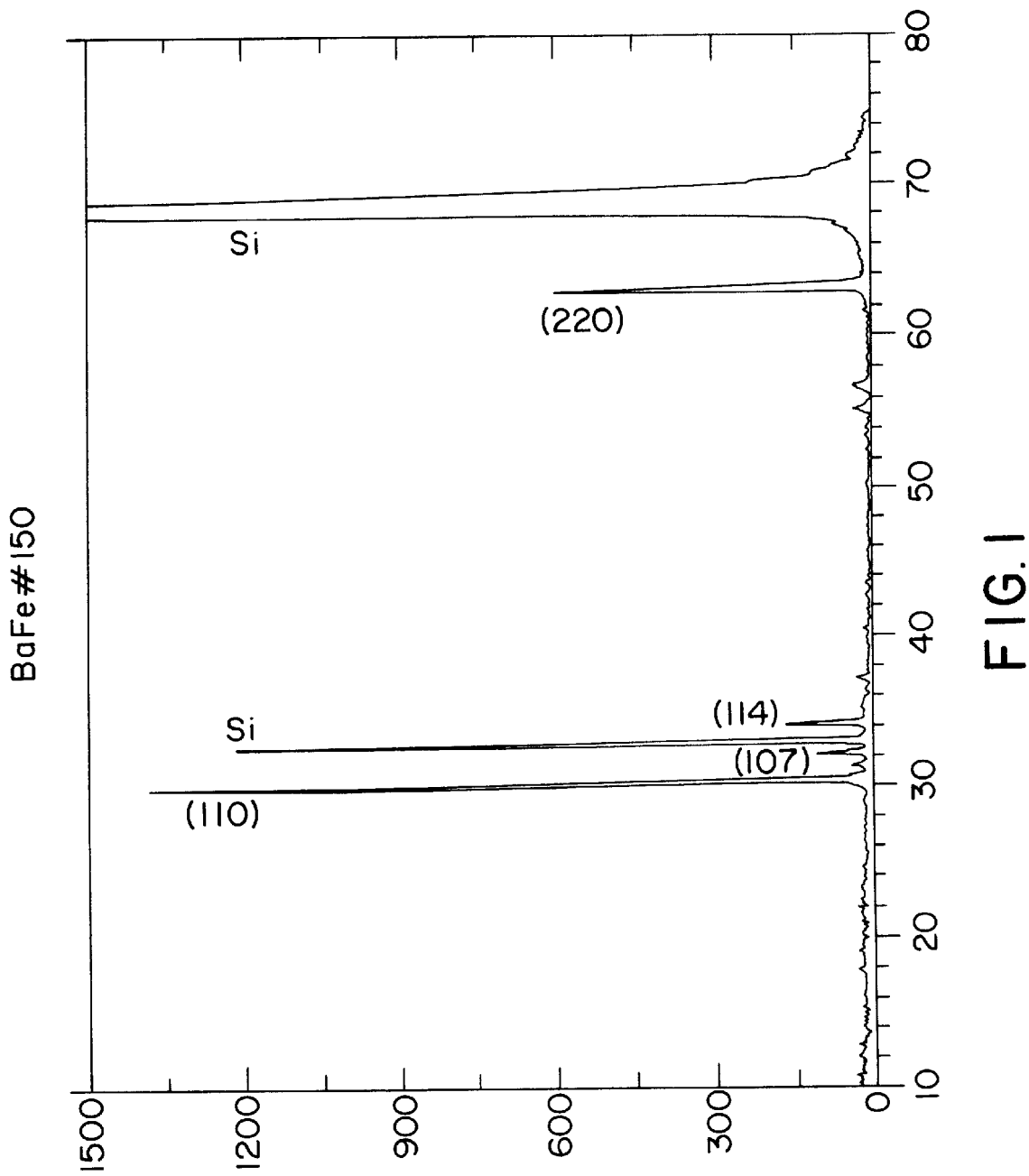
FIG. 1 illustrates the crystal orientation of a barium hexaferrite film without a platinum underlayer.

Under the present process, barium hexaferrite thin films are preferably deposited by conventional rf diode sputtering, followed by post-deposition annealing. It has been previously reported that c-axis nearly in-plane oriented barium hexaferrite thin films can be deposited on thermally oxidized silicon substrates by reactive rf diode sputtering.

A typical rf diode sputtering system includes a vacuum chamber. Substrates are located in close vicinity to a target, which is the material to be deposited in the chamber. The sputtering chamber is first pumped down to a high vacuum. The sputtering gas is then flowed into the chamber. An rf electrical potential is applied between the target (cathode) and the substrate holder (anode). The sputtering gas is then ionized by the electrons emitted from the cathode, which are oscillating within the field. The ions near the cathode are accelerated towards the target and knock off atoms from the target in a billiard type collision. The sputtered atoms from the target are then deposited onto substrates in the form of a thin film. In the present invention, both barium hexaferrite and Pt films preferably are deposited using this technique.

In several studies, the same sputtering conditions as set forth above were used to deposit barium hexaferrite films on a novel thin polycrystalline underlayer at room temperature. The platinum underlayer was deposited at room temperature, at a sputtering power of 50 watts, an argon pressure of 5 mTorr and with a grounded substrate. Other methods, such as MBE or any kind of evaporation, ion beam deposition, laser ablation, etc, can also be used to deposit Pt thin films. Use of a Pt underlayer under the present invention is not limited, however, to sputter-deposited barium hexaferrite films. Other deposition methods which produce an amorphous barium hexaferrite film will provide similar results. Furthermore, as the barium hexaferrite orientation is rather insensitive to the platinum microstructure, deposition methods for Pt other than sputtering will provide similar results.

The substrate was single crystal silicon with an oxidized surface. However, any substrate suitable to sustain the preferred range of annealing temperatures of the present invention could be used to deposit the double-layer film. For example, SiC, Macor, Alumina, Quartz, and any glass having a softening point higher than 800° C. can be used as substrates to deposit the bilayer film.

In the case of low-temperature deposition followed by annealing, the Pt is crystalline as-deposited, while the barium ferrite is amorphous as deposited (with or without the Pt underlayer). Crystallization occurs during the post-deposition annealing step.

The multi-layer films were thus annealed at approximately 800° C. for approximately 15 min to accomplish a complete crystallization. This combination of annealing time and temperature provided satisfactory films. Within a preferred post-deposition annealing temperature range of approximately 750° C. to 950° C. the correct barium hexaferrite phase was formed, but grain size was inversely dependent on temperature. The application in which the film will be used will determine how a time-temperature balance is selected. Annealing in air provides adequate $O_2$ for film crystallization. Any annealing atmosphere containing adequate oxygen is suitable for use in the present invention. However, annealing in air, which is an inexpensive and easy process is preferable.

Figure 2:
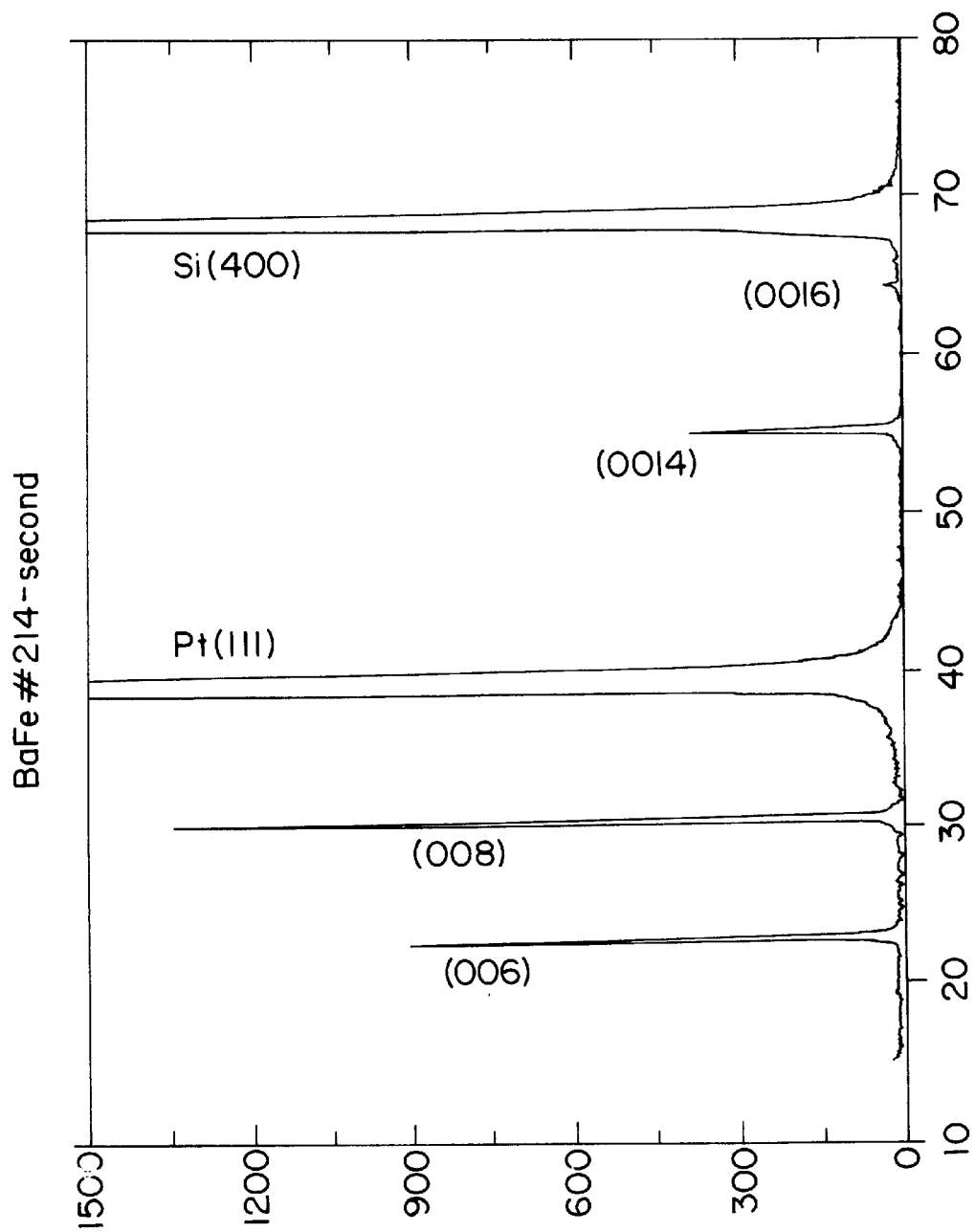
FIG. 2 illustrates the crystal orientation of a barium hexaferrite film with a platinum underlayer.

After annealing the double layer film, an excellent c-axis perpendicular orientation was obtained. X-ray defraction spectra showing the crystal orientation for films without and with underlayer are shown in FIGS. 1 and 2, respectively. Without the underlayer, the c-axes of barium hexaferrite crystals are mostly in-plane oriented as indicated by the predominant (110) and (220) peaks. However, with the underlayer, the c-axes are well aligned in the perpendicular direction, as shown by the (001) series of reflections of FIG. 2.

Figure 3:
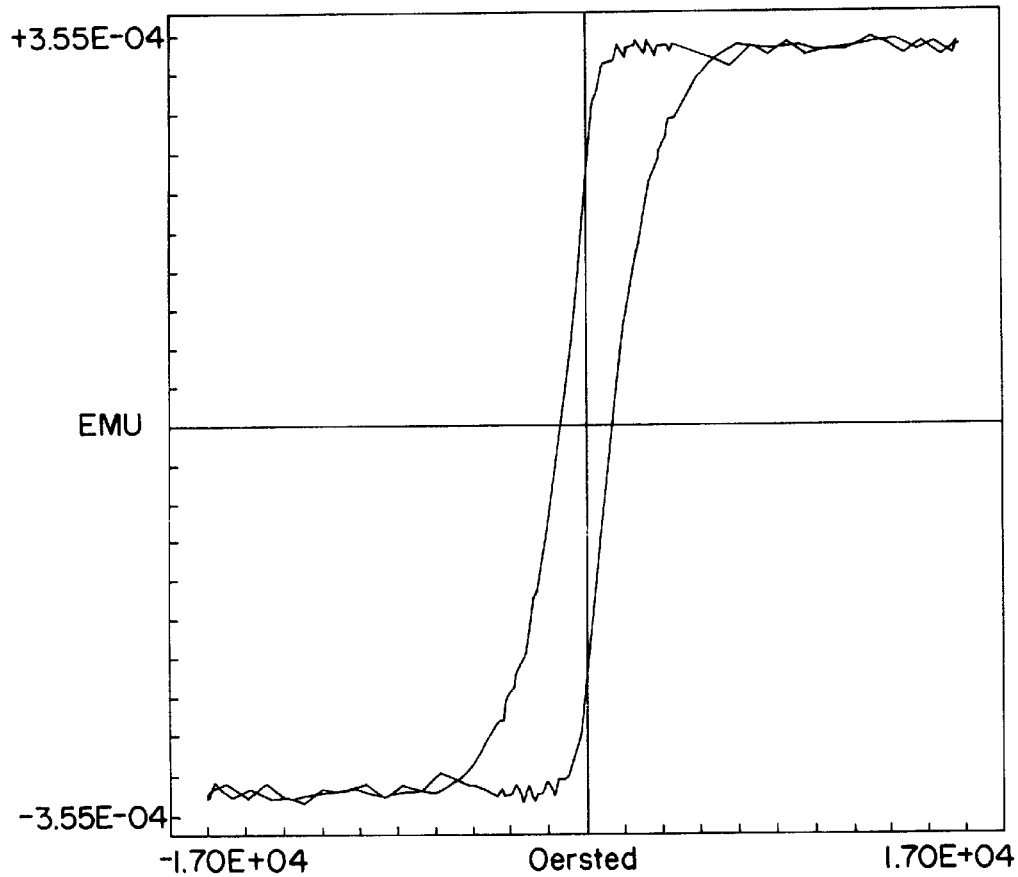
FIG. 3 illustrates an easy axis hysteresis loop of a sample.
Figure 4:
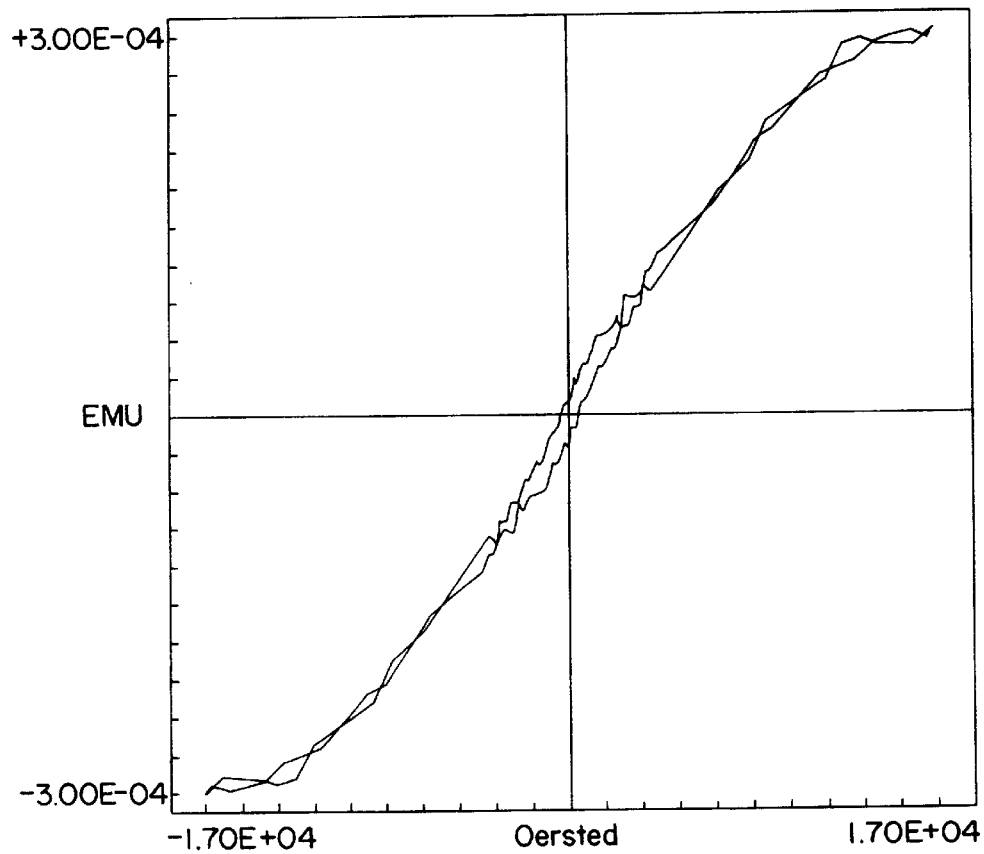
FIG. 4 illustrates a hard axis hysteresis loop of a sample.

Both easy and hard axis hysteresis loops of the film are shown in FIGS. 3 and 4, respectively. The nearly closed hard axis loop also demonstrates the excellent c-axis perpendicular orientation of the film. The saturation magnetization of this film is about 380 emu/cc, which is very close to the value of bulk barium hexaferrite single crystal. The coercivity of the easy axis loop is about 1.2 KOe. The anisotropy field obtained from the hard axis loop is about 16 KOe, which is also close to the magnetocrystalline anisotropy field of barium hexaferrite.

TEM microstructural studies showed that very few acicular grains exist in the film, indicating that the c-axis in-plane oriented crystal grains are very rare.

Figure 5:
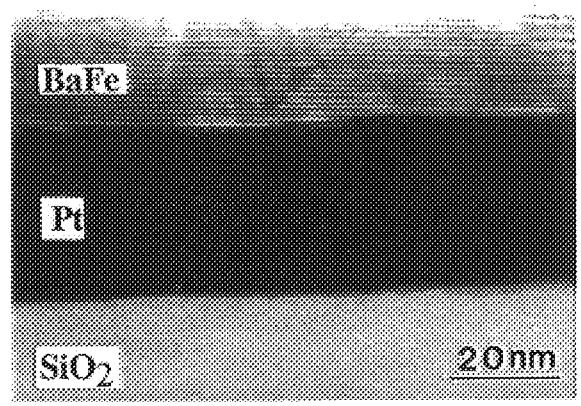
FIG. 5 illustrates a TEM cross section view of a sample.

A TEM cross section view of this sample is shown in FIG. 5. The lattice fringes of the crystal basal planes are found to be parallel to the film plane, providing additional evidence of the strong c-axis perpendicular orientation. From the cross section picture, the grain size is on the order of 1000 Å.

It is expected that in-situ heating for the purpose of crystallizing the baruium hexaferrite film will work in the presence of the Pt underlayer. Improvements in the inerface quality over films crystallized using in-situ heating with no Pt underlayer are anticipated because the Pt acts as a diffusion barrier. The interfaces of the film crystallized using ex-situ annealing show this effect (see FIG. 5).

The present studies show that a few monolayers of the underlayer are sufficient to introduce a good c-axis perpendicular orientation in the barium hexaferrite films. For economic reasons, a thin Pt underlayer is preferred. However, the Pt underlayer is preferably sufficiently thick to be continuous. Preferably the Pt underlayer is at least approximately 100 Å thick to ensure continuity.

Moreover, because of the good interface between barium hexaferrite thin films and the underlayer, barium hexaferrite as thin as one unit cell thick, i.e., approximately 23 Å with good c-axis perpendicular orientation can be achieved. Provided that there is a continuous Pt underlayer, perpendicular orientation in the barium hexaferrite layer occurs independent of the thickness of the barium hexaferrite layer. As the magnetic properties of the barium hexaferrite may be dependent upon the thickness of the barium hexaferrite layer the optimum thickness range of the barium hexaferrite layer will very likely depend upon the application. For perpendicular recording, the magnetic layer thickness typically ranges from a few hundred to 2000 Å depending upon the design of the recording system. For microwave applications, a magnetic layer thickness of a few microns is normally needed.

It is to be understood that although a pure Pt underlayer is preferred, Pt underlayers having a few percentage points of foreign elements added will not affect the performance of the present barium hexaferrite thin films.

Although the invention has been described in detail for purposes of illustration, it is to be understood that such detail is solely for that purpose and that variations can be made therein by those skilled in the art without departing from the spirit and scope of the invention except as it may be limited by the claims.

What is claimed is:

1. A method of producing a barium hexaferrite thin film exhibiting c-axis perpendicular orientation, comprising the steps of:
    a. depositing an underlayer of platinum upon a substrate;
    b. depositing, upon the platinum underlayer, an amorphous barium hexaferrite thin film to produce a two-layer film; and
    c. annealing the barium hexaferrite thin film until the barium hexaferrite thin film crystallizes and exhibits substantially uniform c-axis perpendicular orientation.

2. The method of claim 1 wherein the barium hexaferrite thin film is annealed subsequent to its deposition on the platinum underlayer.

3. The method of claim 2 wherein the annealing temperature is significantly higher than the temperature at which the amorphous barium hexaferrite thin film is deposited upon the platinum underlayer.

4. The method of claim 3 wherein the annealing temperature is sufficiently high to produce the crystalline barium hexaferrite phase.

5. The method of claim 3 wherein the annealing temperature is in the range of approximately 750° to 950° C.

6. The method of claim 1 wherein the platinum underlayer is sufficiently thick to be continuous.

7. The method of claim 1 wherein the thin film of barium hexaferrite is at least approximately one unit cell thick.

8. The method of claim 1 wherein the platinum underlayer functions as a diffusion barrier that blocks the intermixing of barium atoms with the substrate.

9. The method of claim 1 wherein the barium hexaferrite thin film is deposited in the presence of temperatures sufficiently high to produce the crystalline barium hexaferrite phase.

10. A recording medium, comprising:
    a. a substrate;
    b. a platinum underlayer deposited upon the substrate; and
    c. a crystallized barium hexaferrite thin film that has been formed upon the platinum underlayer, the barium hexaferrite thin film exhibiting substantially uniform c-axis perpendicular orientation.

11. The recording medium of claim 10 wherein the crystallized barium hexaferrite thin film has been formed upon the platinum underlayer via annealing subsequent to deposition on the platinum underlayer.

12. The recording medium of claim 11, wherein the barium hexaferrite thin film has been annealed at a temperature significantly higher than the temperature present during deposition.

13. The recording medium of claim 12 wherein the annealing temperature is sufficiently high to produce the crystalline barium hexaferrite phase.

14. The recording medium of claim 12 wherein the annealing temperature is in the range of approximately 750° C. to 950° C.

15. The recording medium of claim 10 wherein the platinum underlayer is sufficiently thick to be continuous.

16. The recording medium of claim 10 wherein the thin film of barium hexaferrite is at least approximately one unit cell thick.

17. The recording medium of claim 10 wherein the barium hexaferrite thin film has been deposited in the presence of temperatures sufficiently high to produce the crystalline barium hexaferrite phase.

* * * * *